M. W. HAZLETT.
LAMP BRACKET.
APPLICATION FILED NOV. 26, 1912.
1,077,531.
Patented Nov. 4, 1913.
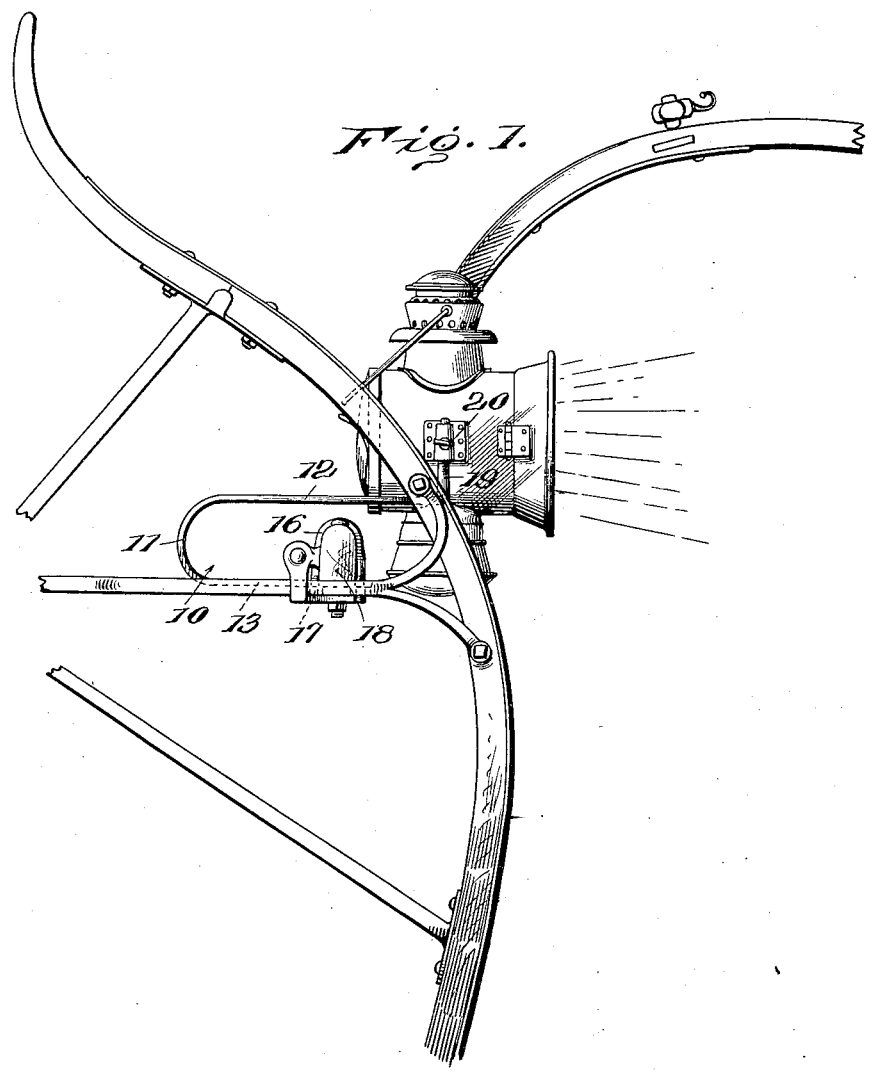
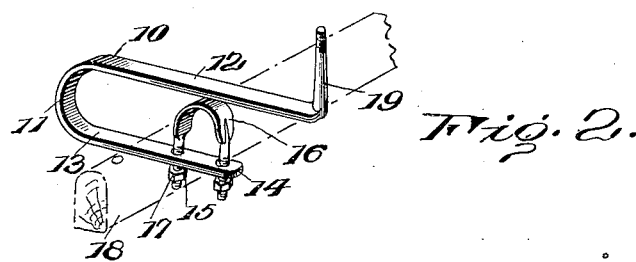
WITNESSES
INVENTOR
M. W. Hazlett.
Attorneys.

UNITED STATES PATENT OFFICE.

MERRITT W. HAZLETT, OF TREADWELL, NEW YORK.

LAMP-BRACKET.

1,077,531.  Specification of Letters Patent.  Patented Nov. 4, 1913.

Application filed November 26, 1912. Serial No. 733,671.

*To all whom it may concern:*

Be it known that I, MERRITT W. HAZLETT, citizen of the United States, residing at Treadwell, in the county of Delaware and State of New York, have invented certain new and useful Improvements in Lamp-Brackets, of which the following is a specification.

This invention relates to an improvement in lamp brackets for vehicles.

The primary object of the invention is to provide a lamp bracket for sleighs or similar vehicles which may be readily positioned on the frame and which will support the lamp at a point where it may be conveniently attached and removed.

Another object of the invention is to provide a lamp bracket which will support the lamp at a point in advance of the frame of the sleigh, the bracket while supporting the lamp against movement cushioning the lamp when the sleigh contacts with an obstruction.

In the drawings: Figure 1 is a side elevation showing the device secured to one of the transverse connecting bars of the sleigh frame; Fig. 2 is a perspective view of the bracket.

The bracket consists of the member 10 which is formed of flat bar iron, being bent at the point 11 to form spaced portions 12 and 13. The portion 13 adjacent the terminal 14 is provided with apertures 15 which receive the threaded terminals of the yoke 16, nuts 17 being threaded on said terminals, the yoke embracing a transverse bar 18 of the sleigh frame. The nuts 17 are then tightened until the yoke draws the portion 13 in contact with the transverse member 18, rigidly supporting the bracket on the sleigh frame. The upper portion 13 of the member 10 is more extensive than the lower portion 13, its terminal 19 being disposed at right angles to the body portion and forming a lamp support which enters the socket 20 of the lamp, being held within said socket by a set screw or any other suitable means.

While the member 10 is formed of bar iron, the peculiar bending of the member is such as to give the member a certain resiliency which will cushion the lamp when the runners of the sleigh meet with an obstruction.

It will thus be noted that the lamp will be resiliently supported at a point in advance of the body of the sleigh, the supporting member being formed of a single piece of material bent to form a spring bracket.

The many advantages of a construction of this character will be clearly apparent, as it will be seen that the bracket may be attached at different points on the sleigh frame, the construction being such that the bracket is supported in front of its point of attachment to the vehicle, the lamp being effectually cushioned and normally maintained stable.

It will also be seen that the construction is such as may be easily and economically manufactured and that the device may be readily positioned on a vehicle without in any way altering its construction.

Having thus described the invention, what I claim is:

A lamp-bracket comprising a member, one terminal of which is secured to the under face of a transverse bar of a vehicle, the member being bent intermediate its ends and carried forward over and beyond said bar, its terminals being bent at right angles to its body portion to form a lamp support, the member being sufficiently resilient whereby its portion which extends over the bar will be normally spaced from the bar, the bar forming a support for said portion when excessive weight is applied to the same.

In testimony whereof I affix my signature in presence of two witnesses.

MERRITT W. HAZLETT. [L. S.]

Witnesses:
ORVILLE S. KELLOGG,
HUGH A. MITCHELL.

---

Copies of this patent may be obtained for five cents each, by addressing the "Commissioner of Patents, Washington, D. C."